(12) United States Patent
Alpert et al.

(10) Patent No.: US 12,340,600 B2
(45) Date of Patent: Jun. 24, 2025

(54) DEVICES AND METHODS FOR MONITORING DRIVERS OF VEHICLES

(71) Applicant: Nauto, Inc., Palo Alto, CA (US)

(72) Inventors: Benjamin Oren Alpert, Sunnyvale, CA (US); Jacek Jakub Konieczny, Poznan (PL); Shukui Zhang, Redwood City, CA (US)

(73) Assignee: Nauto, Inc., Sunnyvale, CA (US)

( * ) Notice: Subject to any disclaimer, the term of this patent is extended or adjusted under 35 U.S.C. 154(b) by 0 days.

(21) Appl. No.: 17/112,967

(22) Filed: Dec. 4, 2020

(65) Prior Publication Data
US 2022/0180109 A1 Jun. 9, 2022

(51) Int. Cl.
*G06T 7/70* (2017.01)
*G06F 18/2413* (2023.01)
*G06F 18/2431* (2023.01)
*G06V 20/59* (2022.01)

(52) U.S. Cl.
CPC ........ *G06V 20/597* (2022.01); *G06F 18/2413* (2023.01); *G06F 18/2431* (2023.01); *G06T 7/70* (2017.01); *G06T 2207/20081* (2013.01); *G06T 2207/20084* (2013.01); *G06T 2207/30201* (2013.01)

(58) Field of Classification Search
CPC ............... G06V 20/597; G06V 10/764; G06V 30/19173; G06V 20/56; G06V 40/172; G06V 10/82; G06V 40/197; G06V 40/161; G06T 7/70; G06T 2207/20081; G06T 2207/30201; G06T 2207/20084; G06K 9/627; G06K 9/628; G06F 18/2431; G06F 18/2413
See application file for complete search history.

(56) References Cited

U.S. PATENT DOCUMENTS

| | | | |
|---|---|---|---|
| 10,032,318 B1* | 7/2018 | Ferguson | G07C 5/0816 |
| 10,752,253 B1 | 8/2020 | Nath et al. | |
| 2002/0140562 A1* | 10/2002 | Gutta | G08G 1/166 |
| | | | 348/148 |
| 2010/0033333 A1* | 2/2010 | Victor | G06V 20/597 |
| | | | 340/576 |
| 2013/0073115 A1* | 3/2013 | Levin | A61B 5/18 |
| | | | 701/1 |
| 2014/0300739 A1* | 10/2014 | Mimar | G06Q 40/08 |
| | | | 348/148 |
| 2018/0032825 A1* | 2/2018 | Fung | G06V 20/597 |

(Continued)

OTHER PUBLICATIONS

Extended European Search Report for EP Patent Appln. No. 21195098.5 dated Feb. 28, 2022.

(Continued)

*Primary Examiner* — Syed Haider
(74) *Attorney, Agent, or Firm* — Vista IP Law Group, LLP (57) ABSTRACT

An apparatus includes: a camera configured to view a driver of a vehicle; and a processing unit configured to receive an image of the driver from the camera; wherein the processing unit is configured to process the image of the driver to determine whether the driver is engaged with a driving task or not; and wherein the processing unit is configured to determine whether the driver is engaged with the driving task or not based on a pose of the driver as it appears in the image without a need to determine a gaze direction of an eye of the driver.

26 Claims, 7 Drawing Sheets

(56) References Cited

U.S. PATENT DOCUMENTS

| | | | | |
|---|---|---|---|---|
| 2018/0126901 A1* | 5/2018 | Levkova | ............... | G06V 20/597 |
| 2019/0065873 A1* | 2/2019 | Wang | .................... | G06V 40/168 |
| 2019/0122044 A1* | 4/2019 | Noble | .................. | G06V 20/597 |
| 2019/0143891 A1* | 5/2019 | Aizawa | .................. | B60Q 9/008 |
| | | | | 382/103 |
| 2019/0188505 A1* | 6/2019 | Madkor | ............... | G08G 1/0141 |
| 2019/0367050 A1* | 12/2019 | Victor | ................... | B60W 40/08 |
| 2020/0057487 A1* | 2/2020 | Sicconi | ................. | G08B 21/06 |
| 2020/0207358 A1* | 7/2020 | Katz | .................. | G02B 27/0093 |
| 2021/0056331 A1* | 2/2021 | Sakuma | ................ | B60K 37/06 |
| 2021/0394775 A1* | 12/2021 | Julian | .................... | G08G 1/164 |

OTHER PUBLICATIONS

Vicente, F., et al., "Driver Gaze Tracking and Eyes Off the Road Detection System," IEEE Transactions on Intelligent Transportation Systems, vol. 16, No. 4, Aug. 2015.

\* cited by examiner

DEVICES AND METHODS FOR MONITORING DRIVERS OF VEHICLES

FIELD

The field relates to vehicle cameras, and more particularly, to vehicle cameras configured to monitor drivers of vehicles.

BACKGROUND

Cameras have been used in vehicles to capture images of drivers of the vehicles. For example, cameras have been installed in vehicles for monitoring drivers of vehicles. In some cases, when monitoring drivers of vehicles, it may be desirable to identify the eyes of the driver in the camera images, and to determine a gazing direction of the eyes of the driver. The determined gazing direction may be used to determine whether the driver is keeping his/her eyes on the road or not.

However, in some cases, a gazing direction of the eyes of the driver may not be detectable from camera images. For example, a driver of the vehicle may be wearing a hat that prevents his/her eyes from being captured by the vehicle camera. The driver may also be wearing sun glasses that obstruct the view of the eyes. In some cases, if the driver is wearing transparent prescription glasses, the frame of the glasses may also obstruct the view of the eyes, and/or the lens of the glasses may make detection of the eyes inaccurate.

New techniques for determining whether a driver is engaged with a driving task (such as looking at an environment in front of the vehicle being driven by the driver) or not, without the need to detect gaze direction of the eyes of the driver, are described herein.

SUMMARY

An apparatus includes: a camera configured to view a driver of a vehicle; and a processing unit configured to receive an image of the driver from the camera; wherein the processing unit is configured to process the image of the driver to determine whether the driver is engaged with a driving task or not; and wherein the processing unit is configured to determine whether the driver is engaged with the driving task or not based on a pose of the driver as it appears in the image without a need to determine a gaze direction of an eye of the driver.

Optionally, the processing unit is configured to attempt to determine the gaze direction; wherein the processing unit is configured to use a neural network model to determine one or more pose classifications for the driver; and wherein the processing unit is configured to determine whether the driver is engaged with the driving task or not based on the one or more pose classifications for the driver if the gaze direction cannot be determined.

Optionally, the apparatus further includes a non-transitory medium storing a model, wherein the processing unit is configured to process the image of the driver based on the model to determine whether the driver is engaged with the driving task or not.

Optionally, the model comprises a neural network model.

Optionally, the apparatus further includes a communication unit configured to obtain the neural network model.

Optionally, the neural network model is trained based on images of other drivers.

Optionally, the processing unit is configured to determine metric values for multiple respective pose classifications, and wherein the processing unit is configured to determine whether the driver is engaged with the driving task or not based on one or more of the metric values.

Optionally, the pose classifications comprise two or more of: looking-down pose, looking-up pose, looking-left pose, looking-right pose, cellphone-using pose, smoking pose, holding-object pose, hand(s)-not-on-the wheel pose, not-wearing-seatbelt pose, eye(s)-closed pose, looking-straight pose, one-hand-on-wheel pose, and two-hands-on-wheel pose.

Optionally, the processing unit is configured to compare the metric values with respective thresholds for the respective pose classifications.

Optionally, the processing unit is configured to determine the driver as belonging to one of the pose classifications if the corresponding one of the metric values meets or surpasses the corresponding one of the thresholds.

Optionally, the processing unit is configured to determine the driver as engaged with the driving task or not if one or more of the metric values meet or surpass the corresponding one or more of the thresholds.

Optionally, the apparatus further comprises an additional camera configured to view an environment outside the vehicle; wherein the processing unit is configured to process one or more images from the additional camera to obtain an output; and wherein the processing unit is configured to adjust one or more of the thresholds based on the output.

Optionally, the processing unit is also configured to process the image to determine whether a face of the driver can be detected or not, and wherein the processing unit is configured to process the image of the driver to determine whether the driver is engaged with the driving task or not if the face of the driver is detected from the image.

Optionally, the processing unit is also configured to process the image to determine whether an eye of the driver is closed or not.

Optionally, the processing unit is also configured to determine the gaze direction, and to determine whether the driver is engaged with the driving task or not based on the gaze direction.

Optionally, the processing unit is also configured to determine a collision risk based on whether the driver is engaged with the driving task or not.

Optionally, the camera and the processing unit are integrated as parts of an aftermarket device for the vehicle.

Optionally, the apparatus further includes an additional camera configured to view an environment outside the vehicle, wherein the additional camera is a part of the aftermarket device.

Optionally, the processing unit is configured to determine eye visibility based on a model, such as a neural network model.

An apparatus includes: a camera configured to view a driver of a vehicle; and a processing unit configured to receive an image of the driver from the camera; wherein the processing unit is configured to attempt to determine a gaze direction of an eye of the driver; and wherein the processing unit is configured to determine whether the driver is engaged with a driving task or not based on one or more pose classifications for the driver if the gaze direction cannot be determined.

Optionally, the processing unit is configured to process the image of the driver to determine whether the image of the driver meets one or more pose classifications or not; and wherein the processing unit is configured to determine whether the driver is engaged with the driving task or not based on the image of the driver meeting the one or more pose classifications or not.

Optionally, the processing unit is configured to process the image of the driver based on a neural network model to determine whether the driver is engaged with the driving task or not.

A method performed by an apparatus, includes: receiving an image generated by a camera viewing a driver of a vehicle; and processing, by a processing unit, the image of the driver to determine whether the driver is engaged with a driving task or not; wherein the image of the driver is processed to determine whether the driver is engaged with the driving task or not based on a pose of the driver as it appears in the image without a need to determine a gaze direction of an eye of the driver.

Other and further aspects and features will be evident from reading the following detailed description.

BRIEF DESCRIPTION OF THE DRAWINGS

The drawings illustrate the design and utility of embodiments, in which similar elements are referred to by common reference numerals. In order to better appreciate how advantages and objects are obtained, a more particular description of the embodiments will be described with reference to the accompanying drawings. Understanding that these drawings depict only exemplary embodiments and are not therefore to be considered limiting in the scope of the claimed invention.

DESCRIPTION OF THE EMBODIMENTS

Various embodiments are described hereinafter with reference to the figures. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages of the invention shown. An aspect or an advantage described in conjunction with a particular embodiment is not necessarily limited to that embodiment and can be practiced in any other embodiments even if not so illustrated or if not so explicitly described.

Figure 1:
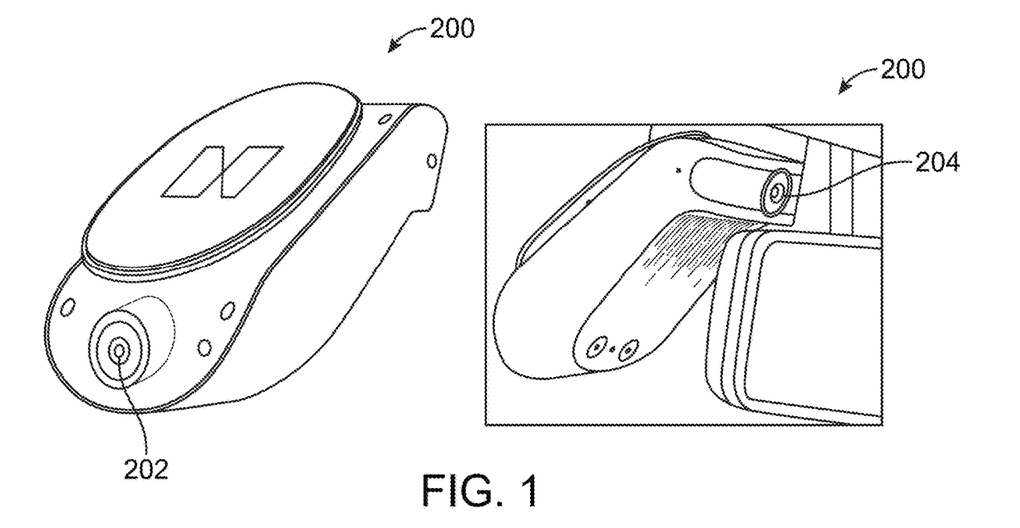
FIG. 1 illustrates an apparatus in accordance with some embodiments.

FIG. 1 illustrates an apparatus 200 in accordance with some embodiments. The apparatus 200 is configured to be mounted to a vehicle, such as to a windshield of the vehicle, to the rear mirror of the vehicle, etc. The apparatus 200 includes a first camera 202 configured to view outside the vehicle, and a second camera 204 configured to view inside a cabin of the vehicle. In the illustrated embodiments, the apparatus 200 is in a form of an after-market device that can be installed in a vehicle (i.e., offline from the manufacturing process of the vehicle). The apparatus 200 may include a connector configured to couple the apparatus 200 to the vehicle. By means of non-limiting examples, the connector may be a suction cup, an adhesive, a clamp, one or more screws, etc. The connector may be configured to detachably secure the apparatus 200 to the vehicle, in which case, the apparatus 200 may be selectively removed from and/or coupled to the vehicle as desired. Alternatively, the connector may be configured to permanently secure the apparatus 200 to the vehicle. In other embodiments, the apparatus 200 may be a component of the vehicle that is installed during a manufacturing process of the vehicle. It should be noted that the apparatus 200 is not limited to having the configuration shown in the example, and that the apparatus 200 may have other configurations in other embodiments. For example, in other embodiments, the apparatus 200 may have a different form factor. In other embodiments, the apparatus 200 may be an end-user device, such as a mobile phone, a tablet, etc., that has one or more cameras.

Figure 2:
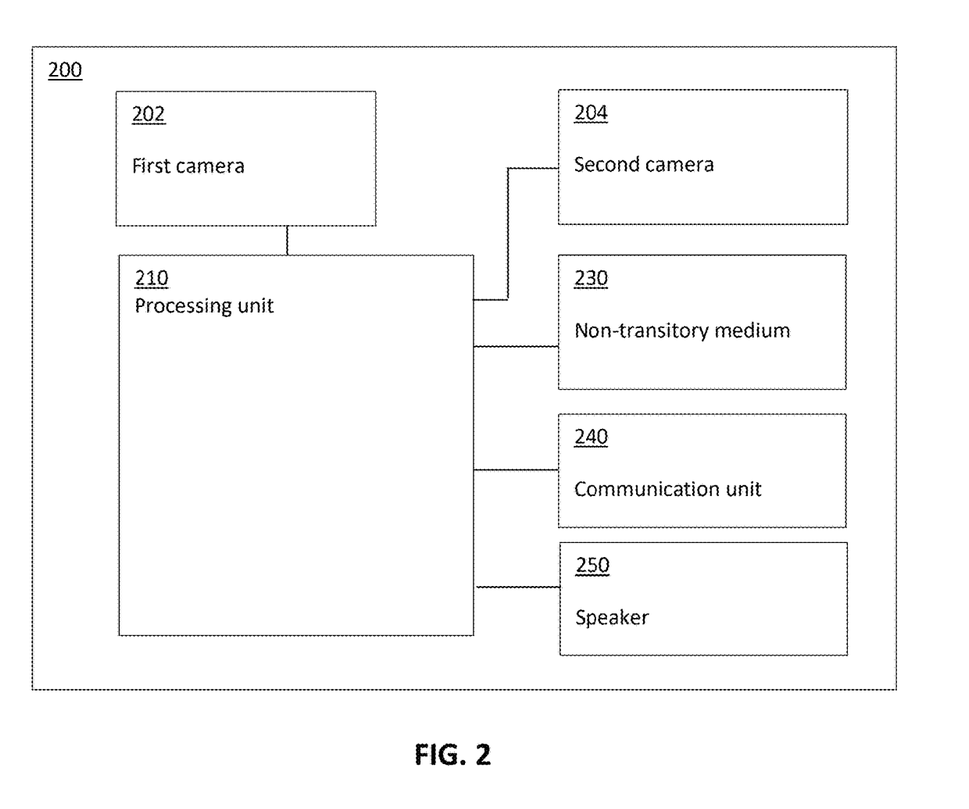
FIG. 2 illustrates a block diagram of the apparatus of FIG. 1 in accordance with some embodiments.

FIG. 2 illustrates a block diagram of the apparatus 200 of FIG. 1 in accordance with some embodiments. The apparatus 200 includes the first camera 202 and the second camera 204. As shown in the figure, the apparatus 200 also includes a processing unit 210 coupled to the first camera 202 and the second camera 204, a non-transitory medium 230 configured to store data, a communication unit 240 coupled to the processing unit 210, and a speaker 250 coupled to the processing unit 210.

In the illustrated embodiments, the first camera 202, the second camera 204, the processing unit 210, the non-transitory medium 230, the communication unit 240, and the speaker 250 may be integrated as parts of an aftermarket device for the vehicle. In other embodiments, the first camera 202, the second camera 204, the processing unit 210, the non-transitory medium 230, the communication unit 240, and the speaker 250 may be integrated with the vehicle, and may be installed in the vehicle during a manufacturing process of the vehicle.

The processing unit 210 is configured to obtain images from the first camera 202 and images from the second camera 204, and process the images from the first and second cameras 202, 204. In some embodiments, the images from the first camera 202 may be processed by the processing unit 210 to monitor an environment outside the vehicle (e.g., for collision detection, collision prevention, driving environment monitoring, etc.). Also, in some embodiments, the images from the second camera 204 may be processed by the processing unit 210 to monitor a driving behavior of the driver (e.g., whether the driver is distracted, drowsy, focused, etc.). In further embodiments, the processing unit 210 may process images from the first camera 202 and/or the second camera 204 to determine a risk of collision, to predict the collision, to provision alerts for the driver, etc. In other embodiments, the apparatus 200 may not include the first camera 202. In such cases, the apparatus 200 is configured to monitor only the environment inside a cabin of the vehicle.

The processing unit 210 of the apparatus 200 may include hardware, software, or a combination of both. By means of non-limiting examples, hardware of the processing unit 210 may include one or more processors and/or more or more integrated circuits. In some embodiments, the processing unit 210 may be implemented as a module and/or may be a part of any integrated circuit.

The non-transitory medium 230 is configured to store data relating to operation of the processing unit 210. In the illustrated embodiments, the non-transitory medium 230 is configured to store a model, which the processing unit 210 can access and utilize to identify pose(s) of a driver as appeared in images from the camera 204, and/or to determine whether the driver is engaged with a driving task or not. Alternatively, the model may configure the processing unit 210 so that it has the capability to identify pose(s) of the driver and/or to determine whether the driver is engaged with a driving task or not. Optionally, the non-transitory medium 230 may also be configured to store image(s) from the first camera 202, and/or image(s) from the second camera 204. Also, in some embodiments, the non-transitory medium 230 may also be configured to store data generated by the processing unit 210.

The model stored in the transitory medium 230 may be any computational model or processing model, including but not limited to neural network model. In some embodiments, the model may include feature extraction parameters, based upon which, the processing unit 210 can extract features from images provided by the camera 204 for identification of objects, such as a driver's head, a hat, a face, a nose, an eye, a mobile device, etc. Also, in some embodiments, the model may include program instructions, commands, scripts, etc. In one implementation, the model may be in a form of an application that can be received wirelessly by the apparatus 200.

The communication unit 240 of the apparatus 200 is configured to receive data wirelessly from a network, such as a cloud, the Internet, Bluetooth network, etc. In some embodiments, the communication unit 240 may also be configured to transmit data wirelessly. For example images from the first camera 202, images from the second camera 204, data generated by the processing unit, or any combination of the foregoing, may be transmitted by the communication unit 240 to another device (e.g., a server, an accessory device such as a mobile phone, another apparatus 200 in another vehicle, etc.) via a network, such as a cloud, the Internet, Bluetooth network, etc. In some embodiments, the communication unit 240 may include one or more antennas. For example, the communication 240 may include a first antenna configured to provide long-range communication, and a second antenna configured to provide near-field communication (such as via Bluetooth). In other embodiments, the communication unit 240 may be configured to transmit and/or receive data physically through a cable or electrical contacts. In such cases, the communication unit 240 may include one or more communication connectors configured to couple with a data transmission device. For example, the communication unit 240 may include a connector configured to couple with a cable, a USB slot configured to receive a USB drive, a memory-card slot configured to receive a memory card, etc.

The speaker 250 of the apparatus 200 is configured to provide audio alert(s) and/or message(s) to a driver of the vehicle. For example, in some embodiments, the processing unit 210 may be configured to detect an imminent collision between the vehicle and an object outside the vehicle. In such cases, in response to the detection of the imminent collision, the processing unit 210 may generate a control signal to cause the speaker 250 to output an audio alert and/or message. As another example, in some embodiments, the processing unit 210 may be configured to determine whether the driver is engaged with a driving task or not. If the driver is not engaged with a driving task, or is not engaged with the driving task for a prescribed period (e.g., 2 seconds, 3 seconds, 4 seconds, 5 seconds, etc.), the processing unit 210 may generate a control signal to cause the speaker 250 to output an audio alert and/or message.

Although the apparatus 200 is described as having the first camera 202 and the second camera 204, in other embodiments, the apparatus 200 may include only the second camera (cabin camera) 204, and not the first camera 202. Also, in other embodiments, the apparatus 200 may include multiple cameras configured to view the cabin inside the vehicle.

Figure 3:
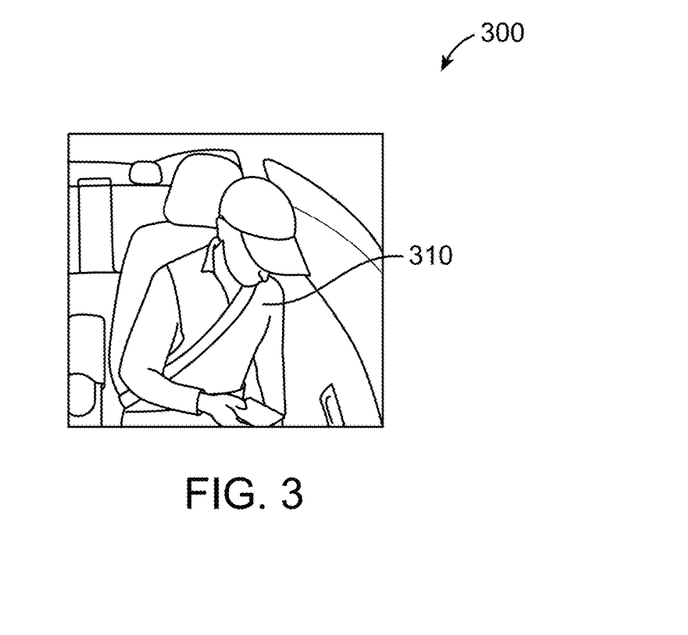
FIG. 3 illustrates an example of an image captured by a camera of the apparatus of FIG. 2.

During use, the apparatus 200 is coupled to a vehicle such that the first camera 202 is viewing outside the vehicle, and the second camera 204 is viewing a driver inside the vehicle. While the driver operates the vehicle, the first camera 202 captures images outside the vehicle, and the second camera 204 captures images inside the vehicle. FIG. 3 illustrates an example of an image 300 captured by the second camera 204 of the apparatus 200 of FIG. 2. As shown in the figure, the image 300 from the second camera 202 may include an image of a driver 310 operating the subject vehicle (the vehicle with the apparatus 200). The processing unit 210 is configured to processing image(s) (e.g., the image 300) from the camera 202, and to determine whether the driver is engaged with a driving task or not. By means of non-limiting examples, a driving task may be paying attention to a road or environment in front of the subject vehicle, having hand(s) on steering wheel, etc.

Figure 4:
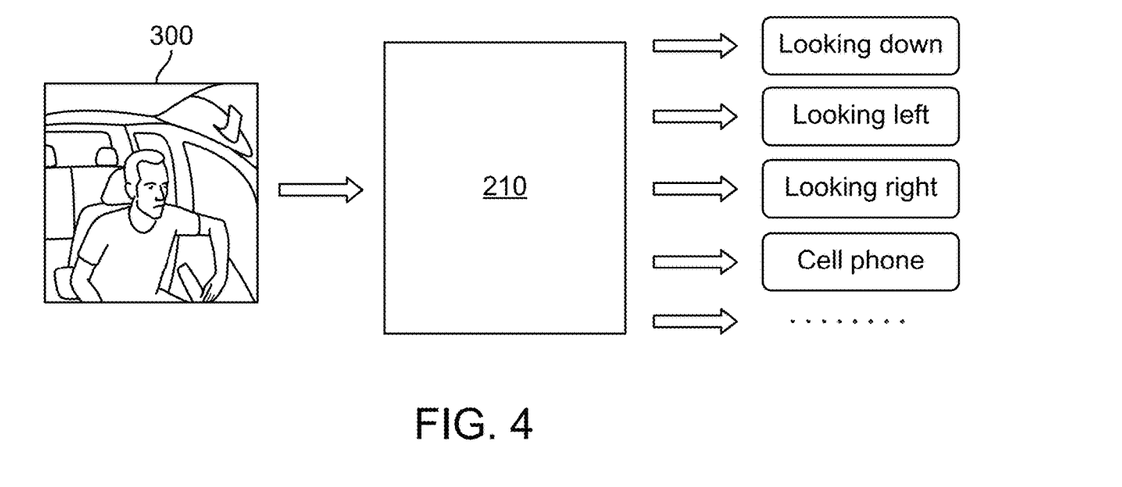
FIG. 4 illustrates an example of classifier.

As shown in FIG. 4, in some embodiments, the processing unit 210 is configured to process the image 300 of the driver from the camera 202, and to determine whether the driver belongs to certain pose classification(s). By means of non-limiting examples, the pose classification(s) may be one or more of: looking-down pose, looking-up pose, looking-left pose, looking-right pose, cellphone-using pose, smoking pose, holding-object pose, hand(s)-not-on-the wheel pose, not-wearing-seatbelt pose, eye(s)-closed pose, looking-straight pose, one-hand-on-wheel pose, and two-hands-on-wheel pose. Also, in some embodiments, the processing unit 210 is configured to determine whether the driver is engaged with a driving task or not based on one or more pose classifications. For example, if the driver's head is "looking" down, and the driver is holding a cell phone, then the processing unit 210 may determine that the driver is not engaged with a driving task (i.e., the driver is not paying attention to the road or to an environment in front of the vehicle). As another example, if the driver's head is "looking" to the right or left, and if the angle of head turn has passed a certain threshold, then the processing unit 210 may determine that the driver is not engaged with a driving task.

In some embodiments, the processing unit 210 is configured to determine whether the driver is engaged with a driving task or not based on one or more pose(s) of the driver as it appears in the image without a need to determine a gaze direction of an eye of the driver. This feature is advantageous because a gaze direction of an eye of the driver may not be captured in an image, or may not be determined accurately. For example, a driver of the vehicle may be wearing a hat that prevents his/her eyes from being captured by the vehicle camera. The driver may also be wearing sun glasses that obstruct the view of the eyes. In some cases, if the driver is wearing transparent prescription glasses, the frame of the glasses may also obstruct the view of the eyes, and/or the lens of the glasses may make detection of the eyes inaccurate. Accordingly, determining whether the driver is engaged with a driving task or not without a need to determine gaze direction of the eye of the driver is advantageous, because even if the eye(s) of the driver cannot be detected and/or if the eye's gazing direction cannot be determined, the processing unit 210 can still determine whether the driver is engaged with a driving task or not.

In some embodiments, the processing unit 210 may use context-based classification to determine whether the driver is engaged with a driving task or not. For example, if the driver's head is looking downward, and if the driver is holding a cell phone at his/her lap wherein the driver's head is oriented towards, then the processing unit 210 may determine that the driver is not engaged with a driving task. The processing unit 210 may make such determination even if the driver's eyes cannot be detected (e.g., because they may be blocked by a cap like that shown in FIG. 3). The processing unit 210 may also use context-based classification to determine one or more poses for the driver. For example, if the driver's head is directing downward, then the processing unit 210 may determine that the driver is looking downward even if the eyes of the driver cannot be detected. As another example, if the driver's head is directing upward, then the processing unit 210 may determine that the driver is looking upward even if the eyes of the driver cannot be detected. As a further example, if the driver's head is directing towards the right, then the processing unit 210 may determine that the driver is looking right even if the eyes of the driver cannot be detected. As a further example, if the driver's head is directing towards the left, then the processing unit 210 may determine that the driver is looking left even if the eyes of the driver cannot be detected.

In one implementation, the processing unit 210 may be configured to use a model to identify one or more poses for the driver, and to determine whether the driver is engaged with a driving task or not. The model may be used by the processing unit 210 to process images from the camera 204. In some embodiments, the model may be stored in the non-transitory medium 230. Also, in some embodiments, the model may be transmitted from a server, and may be received by the apparatus 200 via the communication unit 240.

In some embodiments, the model may be a neural network model. In such cases, the neural network model may be trained based on images of other drivers. For example, the neural network model may be trained using images of drivers to identify different poses, such as looking-down pose, looking-up pose, looking-left pose, looking-right pose, cellphone-using pose, smoking pose, holding-object pose, hand(s)-not-on-the wheel pose, not-wearing-seatbelt pose, eye(s)-closed pose, looking-straight pose, one-hand-on-wheel pose, two-hands-on-wheel pose, etc. In some embodiments, the neural network model may be trained to identify the different poses even without detection of the eyes of the persons in the images. This allows the neural network model to identify different poses and/or to determine whether a driver is engaged with a driving task or not based on context (e.g., based on information captured in the image regarding the state of the driver other than a gazing direction of the eye(s) of the driver). In other embodiments, the model may be any of other types of model that is different from neural network model.

In some embodiments, the neural network model may be trained to classify pose(s) and/or to determine whether the driver is engaged with a driving task or not, based on context. For example, if the driver is holding a cell phone, and has a head pose that is facing downward towards the cell phone, then the neural network model may determine that the driver is not engaged with a driving task (e.g., is not looking at the road or the environment in front of the vehicle) without the need to detect the eyes of the driver.

In some embodiments, deep learning or artificial intelligence may be used to develop a model that identifies pose(s) for the driver and/or to determine whether the driver is engaged with a driving task or not. Such a model can distinguish a driver who is engaged with a driving task from a driver who is not.

In some embodiments, the model utilized by the processing unit 210 to identify pose(s) for the driver may be a convolutional neural network model. In other embodiments, the model may be simply any mathematical model.

Figure 5:
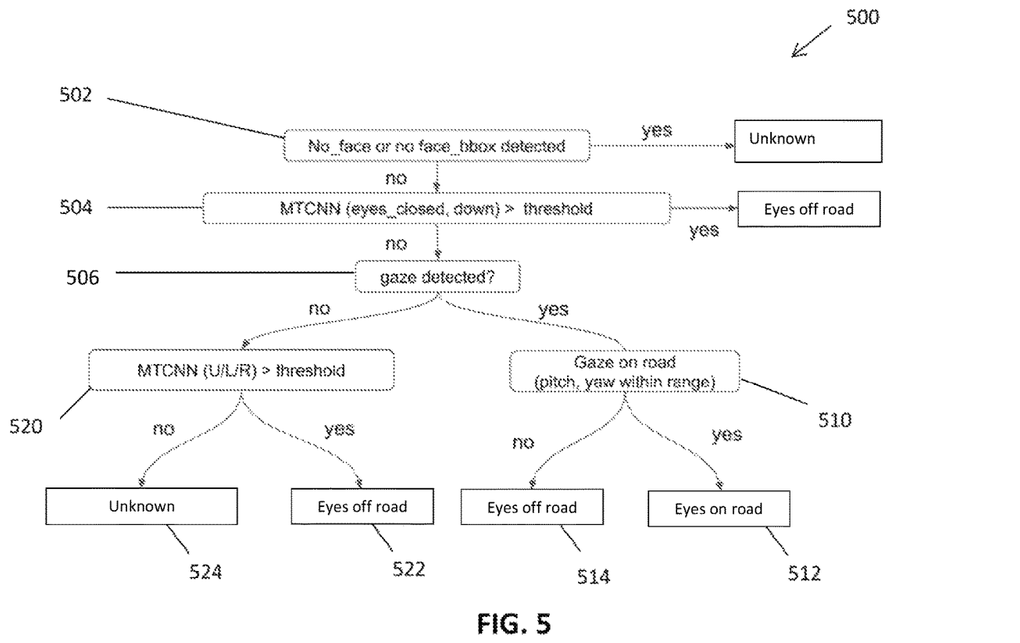
FIG. 5 illustrates an algorithm for determining eyes-on-road or eyes-off-road (gaze tracking).

FIG. 5 illustrates an algorithm 500 for determining whether a driver is engaged with a driving task or not. For example, the algorithm 500 may be utilized for determining whether a driver is paying attention to the road or environment in front of the vehicle. The algorithm 500 may be implemented and/or performed using the processing unit 210 in some embodiments.

First, the processing unit 210 processes an image from the camera 204 to attempt to detect a face of a driver based on the image (item 502). If the face of the driver cannot be detected in the image, the processing unit 210 may then determine that it is unknown as to whether the driver is engaged with a driving task or not. On the other hand, if the processing unit 210 determines that a face of the driver is present in the image, the processing unit 210 may then determine whether the eye(s) of the driver is closed (item 504). In one implementation, the processing unit 210 may be configured to determine eye visibility based on a model, such as a neural network model. If the processing unit 210 determines that the eye(s) of the driver is closed, then the processing unit 210 may determine that the driver is not engaged with a driving task. On the other hand, if the processing unit 210 determines that the eye(s) of the driver is not closed, the processing unit 210 may then attempt to detect a gaze of the eye(s) of the driver based on the image (item 506).

Referring to item 510 in the algorithm 500, if the processing unit 210 successfully detects a gaze of the eye(s) of the driver, the processing unit 210 may then determine a direction of the gaze (item 510). For example, the processing unit 210 may analyze the image to determine a pitch (e.g., up-down direction) and/or a yaw (e.g., left-right direction) of the gazing direction of the eye(s) of the driver. If the pitch of the gazing direction is within a prescribed pitch range, and if the yaw of the gazing direction is within a prescribed yaw range, then the processing unit 210 may determine that the user is engaged with a driving task (i.e., the user is viewing the road or the environment ahead of the vehicle) (item 512). On the other hand, if the pitch of the gazing direction is not within the prescribed pitch range, or if the yaw of the gazing direction is not within the prescribed yaw range, then the processing unit 210 may determine that the user is not engaged with a driving task (item 514).

Referring to item 520 in the algorithm 500, if the processing unit 210 cannot successfully detect a gaze of the eye(s) of the driver, the processing unit 210 may then determine whether the driver is engaged with a driving task or not without requiring a determination of a gaze direction of the eye(s) of the driver (item 520). In some embodiments, the processing unit 210 may be configured to use a model to make such determination based on context (e.g., based on information captured in the image regarding the state of the driver other than a gazing direction of the eye(s) of the driver). In some embodiments, the model may be a neural network model that is configured to perform context-based classification for determining whether the driver is engaged with a driving task or not. In one implementation, the model is configured to process the image to determine whether the driver belongs to one or more pose classifications. If the driver is determined as belonging to one or more pose classifications, then the processing unit 210 may determine that the driver is not engaged with a driving task (item 522). If the driver is determined as not belonging to one or more pose classifications, the processing unit 210 may then determine that the driver is engaged with a driving task or that it is unknown whether the driver is engaged with a driving task or not (item 524).

In some embodiments, the above items 502, 504, 506, 510, 520 may be repeatedly performed by the processing unit 210 to process multiple images in a sequence provided by the camera 204, thereby performing real-time monitoring of the driver while the driver is operating the vehicle.

It should be noted that the algorithm 500 is not limited to the example described, and that the algorithm 500 implemented using the processing unit 210 may have other features and/or variations. For example, in other embodiments, the algorithm 500 may not include item 502 (detection of a face of a driver). As another example, in other embodiments, the algorithm 500 may not include item 504 (detecting of closed-eye condition). Also, in further embodiments, the algorithm 500 may not include item 506 (attempt to detect gaze) and/or item 510 (determination of gaze direction).

Also, in some embodiments, even if a gaze direction of the eye(s) of the driver can be detected by the processing unit 210, the processing unit 210 may still perform context-based classification to determine whether the driver belongs to one or more poses. In some cases, the pose classification(s) may be used by the processing unit 210 to confirm a gaze direction of the eye(s) of the driver. Alternatively, the gaze direction of the eye(s) of the driver may be used by the processing unit 210 to confirm one or more pose classifications for the driver.

Figure 6:
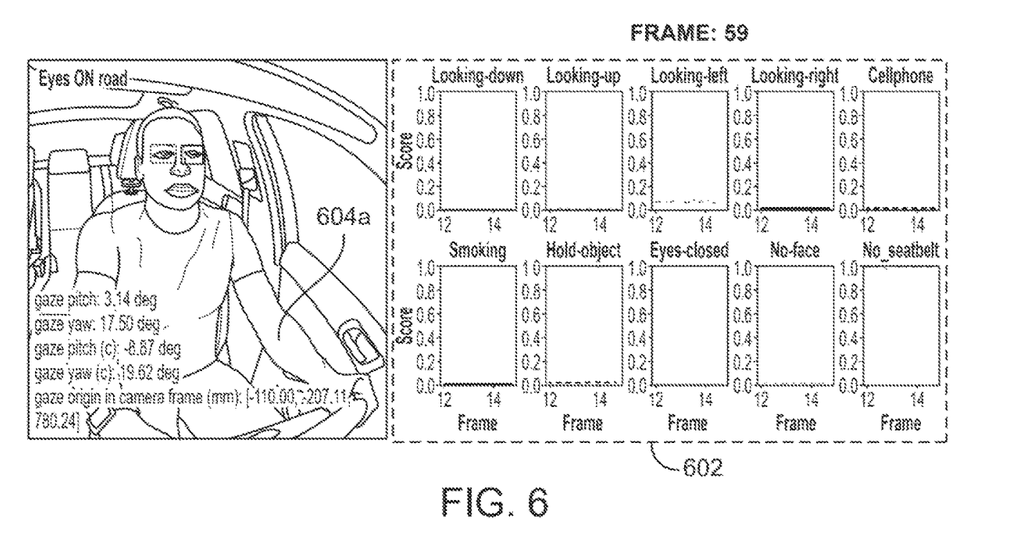
FIG. 6 illustrates an example of an image captured by the camera of FIG. 1, any various classifier outputs.

As discussed, in some embodiments, the processing unit 210 is configured to determine whether the driver belongs to one or more pose classifications based on image from the camera 204, and to determine whether the driver is engaged with a driving task or not based on the one or more pose classifications. In some embodiments, the processing unit 210 is configured to determine metric values for multiple respective pose classifications, and to determine whether the driver is engaged with a driving task or not based on one or more of the metric values. FIG. 6 illustrates examples of classification outputs 602 provided by the processing unit 210 based on the image 604a. In the example, the classification outputs 602 include metric values for respective different pose classifications—i.e., "looking down" classification, "looking up" classification, "looking left" classification, "looking right" classification, "cellphone utilization" classification, "smoking" classification, "hold-object" classification, "eyes-closed" classification, "no face" classification, and "no seatbelt" classification. The metric values for these different pose classifications are relatively low (e.g., below 0.2), indicating that the driver in the image 604a does not meet any of these pose classifications. Also, in the illustrated example, because the driver's eyes are not closed, the gaze direction of the driver can be determined by the processing unit 210. The gaze direction is represented by a graphical object superimposed on the nose of the driver in the image. The graphical object may include a vector or a line that is parallel to a gaze direction. Alternatively or additionally, the graphical object may include one or more vectors or one or more lines that are perpendicular to the gaze direction.

Figure 7:
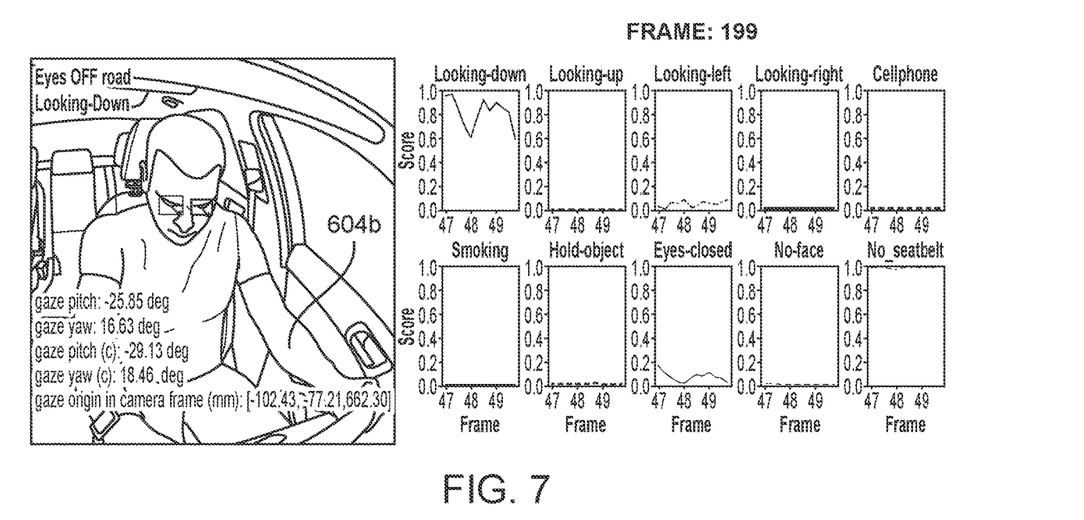
FIG. 7 illustrates another example of an image captured by the camera of FIG. 1, any various classifier outputs.

FIG. 7 illustrates other examples of classification outputs 602 provided by the processing unit 210 based on image 604b. In the illustrated example, the metric value for the "looking down" pose has a relatively high value (e.g., higher than 0.6), indicating that the driver has a "looking down" pose. The metric values for the other poses have relatively low values, indicating that the driver in the image 604b does not meet these pose classifications.

Figure 8:
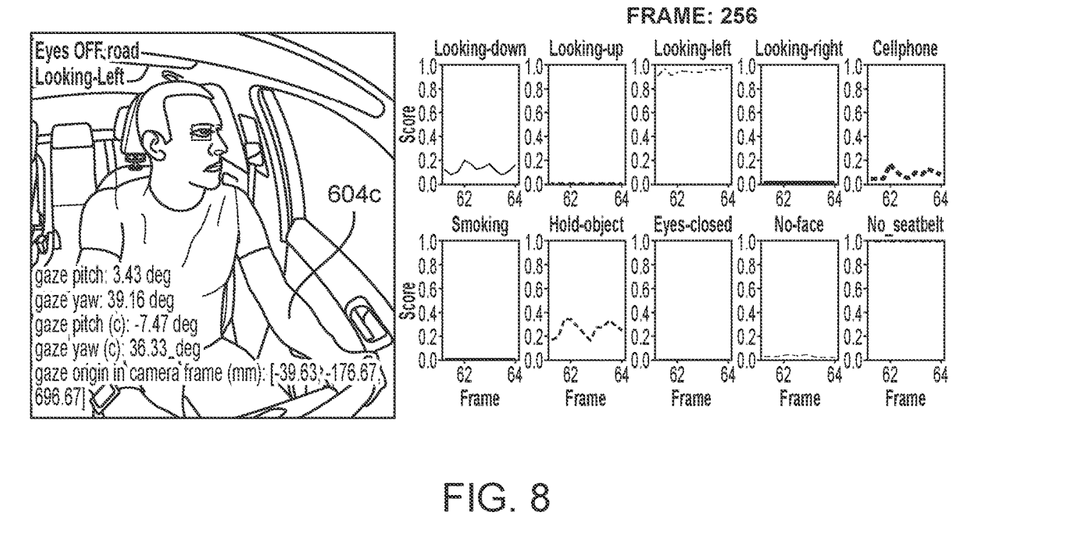
FIG. 8 illustrates another example of an image captured by the camera of FIG. 1, any various classifier outputs.

FIG. 8 illustrates other examples of classification outputs 602 provided by the processing unit 210 based on image 604c. In the illustrated example, the metric value for the "looking left" pose has a relatively high value (e.g., higher than 0.6), indicating that the driver has a "looking left" pose. The metric values for the other poses have relatively low values, indicating that the driver in the image 604c does not meet these pose classifications.

In some embodiments, the processing unit 210 is configured to compare the metric values with respective thresholds for the respective pose classifications. In such cases, the processing unit 210 is configured to determine the driver as belonging to one of the pose classifications if the corresponding one of the metric values meets or surpasses the corresponding one of the thresholds. For example, the thresholds for the different pose classifications may be set to 0.6. In such cases, if any of the metric values for any of the pose classifications exceeds 0.6, then the processing unit 210 may determine that the driver as having a pose belonging to the pose classification (i.e., the one with the metric value exceeding 0.6). Also, in some embodiments, if any of the metric values for any of the pose classifications exceeds the pre-set threshold (e.g., 0.6), then the processing unit 210 may determine that the driver is not engaged with a driving task. Following the above example, if the metric value for the "looking down" pose, the "looking up" pose, the "looking left" pose, the "looking right" pose, the "cellphone usage" pose, or the "eye closed" pose is higher than 0.6, then the processing unit 210 may determine that the driver is not engaged with a driving task.

In the above examples, the same pre-set threshold is implemented for the different respective pose classifications. In other embodiments, at least two of the thresholds for the at least two respective pose classifications may have different values. Also, in the above examples, the metric values for the pose classifications have a range from 0.0 to 1.0, with 1.0 being the highest. In other embodiments, the metric values for the pose classifications may have other ranges. Also, in other embodiments, the convention of the metric values may be reversed in that a lower metric value may indicate that the driver is meeting a certain pose classification, and a higher metric value may indicate that the driver is not meeting a certain pose classification.

Also, in some embodiments, the thresholds for the different pose classifications may be tuned in a tuning procedure, so that the different pose classifications will have their respective tuned thresholds for allowing the processing unit 210 to determine whether an image of a driver belongs to certain pose classification(s) or not.

In some embodiments, a single model may be utilized by the processing unit 210 to provide multiple pose classifications. The multiple pose classifications may be outputted by the processing unit 210 in parallel or in sequence. In other embodiments, the model may comprise multiple sub-models, with each sub-model being configured to detect a specific classification of pose. For example, there may be a sub-model that detects face, a sub-model that detects gaze direction, a sub-model that detects looking-up pose, a sub-model that detects looking-down pose, a sub-model that detects looking-right pose, a sub-model that detects looking-left pose, a sub-model that detects cell phone usage pose, a sub-model that detects hand(s)-not-on-the wheel pose, a sub-model that detects not-wearing-seatbelt pose, a sub-model that detects eye(s)-closed pose, etc.

In the above embodiments, the thresholds for the respective pose classifications are configured to determine whether a driver's image meet the respective pose classifications. In other embodiments, the thresholds for the respective pose classifications may be configured to allow the processing unit 210 to determine whether the driver is engaging with a driving task or not. In such cases, if one or more metric values for one or more respective pose classifications meet or surpass the respective one or more thresholds, then the processing unit 210 may determine that the driver is engaged with the driving task or not. In some embodiments, the pose classifications may belong to a "distraction" class. In such cases, if a criterion for any of the pose classifications is met, then the processing unit 210 may determine that the driver is not engaged with the driving task (e.g., the driver is distracted). Examples of pose classifications belonging to "distraction" class include "looking-left" pose, "looking-right" pose, "looking-up" pose, "looking-down" pose, "cell phone holding" pose, etc. In other embodiments, the pose classifications may belong to an "attention" class. In such cases, if a criterion for any of the pose classifications is met, then the processing unit 210 may determine that the driver is engaged with the driving task (e.g., the driver is paying attention to driving). Examples of pose classifications belonging to "attention" class include "looking-straight" pose, "hand(s) on wheel" pose, etc.

As illustrated in the above examples, context-based classification is advantageous because it allows the processing unit 210 to identify driver who is not engaged with a driving task even if a gaze direction of the eyes of the driver cannot be detected. In some cases, even if the apparatus 200 is mounted at very off angle with respect to the vehicle (which may result in the driver appearing at odd angles and/or positions in the camera images), context-based identification will still allow the processing unit 210 to identify driver who is not engaged with a driving task. Aftermarket products may be mounted in different positions, making it difficult to detect eyes and gaze. The features described herein are advantageous because they allow determination of whether the driver is engaged with driving task or not even if the apparatus 200 is mounted in such a way that the driver's eyes and gaze cannot be detected.

It should be noted that the processing unit 210 is not limited to using a neural network model to determine pose classification(s) and/or whether a driver is engaged with a driving task or not, and that the processing unit 210 may utilized any processing technique, algorithm, or processing architecture to determine pose classification(s) and/or whether a driver is engaged with a driving task or not. By means of non-limiting examples, the processing unit 210 may utilize equations, regression, classification, neural networks (e.g., convolutional neural networks, deep neural networks), heuristics, selection (e.g., from a library, graph, or chart), instance-based methods (e.g., nearest neighbor), correlation methods, regularization methods (e.g., ridge regression), decision trees, Baysean methods, kernel methods, probability, deterministics, or a combination of two or more of the above, to process image(s) from the camera 204 to determine pose classification(s) and/or whether a driver is engaged with a driving task or not. A pose classification can be a binary classification or binary score (e.g., looking up or not), a score (e.g., continuous or discontinuous), a classification (e.g., high, medium, low), or be any other suitable measure of pose classification.

Also, it should be noted that the processing unit 210 is not limited to detecting poses indicating that the driver is not engaged with driving task (e.g., poses belonging to "distraction" class). In other embodiments, the processing unit 210 may be configured to detect poses indicating that the driver is engaged with driving task (e.g., poses belonging to "attention" class). In further embodiments, the processing unit 210 may be configured to detect both (1) poses indicating that the driver is not engaged with driving task, and (2) poses indicating that the driver is engaged with driving task.

In one or more embodiments described herein, the processing unit 210 may be further configured to determine a collision risk based on whether the driver is engaged with a driving task or not. In some embodiments, the processing unit 210 may be configured to determine the collision risk based solely on whether the driver is engaged with a driving task or not. For example, the processing unit 210 may determine that the collision risk is "high" if the driver is not engaged with a driving task, and may determine that the collision risk is "low" if the driver is engaged with a driving task. In other embodiments, the processing unit 210 may be configured to determine the collision risk based on additional information. For example, the processing unit 210 may be configured to keep track how long the driver is not engaged with a driving task, and may determine a level of collision risk based on a duration of the "lack of engagement with a driving task" condition. As another example, the processing unit 210 may process images from the first camera 202 to determine whether there is an obstacle (e.g., a vehicle, a pedestrian, etc.) in front of the subject vehicle, and may determine the collision risk based on a detection of such obstacle and in combination of the pose classification(s).

In the above embodiments, camera images from the camera 204 (viewing an environment in the cabin of the vehicle) are utilized to monitor driver's engagement with driving task. In other embodiments, camera images from the camera 202 (the camera viewing the external environment of the vehicle) may also be utilized as well. For example, in some embodiments, the camera images capturing the outside environment of the vehicle may be processed by the processing unit 210 to determine whether the vehicle is turning left, moving straight, or turning right. Based on the direction in which the vehicle is travelling, the processing unit 210 may then adjust one or more thresholds for pose classifications of the driver, and/or one or more thresholds for determining whether the driver is engaged with driving task or not. For example, if the processing unit 210 determines that the vehicle is turning left (based on processing of images from the camera 202), the processing unit 210 may then adjust the threshold for the "looking-left" pose classification, so that a driver who is looking left will not be classified as not engaged with driving task. In one implementation the threshold for "looking-left" pose classification may have a value of 0.6 for a straight-travelling vehicle, and may have a value of 0.9 for a left-turning vehicle. In such cases, if the processing unit 210 determines that the vehicle is travelling straight (based on processing of image(s) from the camera 202), and determines that the metric for the "looking-left" pose has a value of 0.7 (based on processing of image(s) from the camera 204), then the processing unit 210 may determine that the driver is not engaged with the driving task (because the metric value of 0.7 surpasses the threshold 0.6 for straight travelling vehicle). On the other hand, if the processing unit 210 determines that the vehicle is turning left (based on processing of image(s) from the camera 202), and determines that the metric for the "looking-left" pose has a value of 0.7 (based on processing of image(s) from the camera 204), then the processing unit 210 may determine that the driver is engaged with the driving task (because the metric value of 0.7 does not surpass the threshold 0.9 for left-turning vehicle). Thus, as illustrated in the above examples, a pose classification (e.g., "looking-left" pose) may belong to "distraction" class in one situation, and may belong to "attention" class in another situation. In some embodiments, the processing unit 210 is configured to process images of the external environment from the camera 202 to obtain an output, and adjust one or more thresholds based on the output. By means of non-limiting examples, the output may be a classification of driving condition, a classification of the external environment, a determined feature of the environment, a context of an operation of the vehicle, etc.

Figure 9:
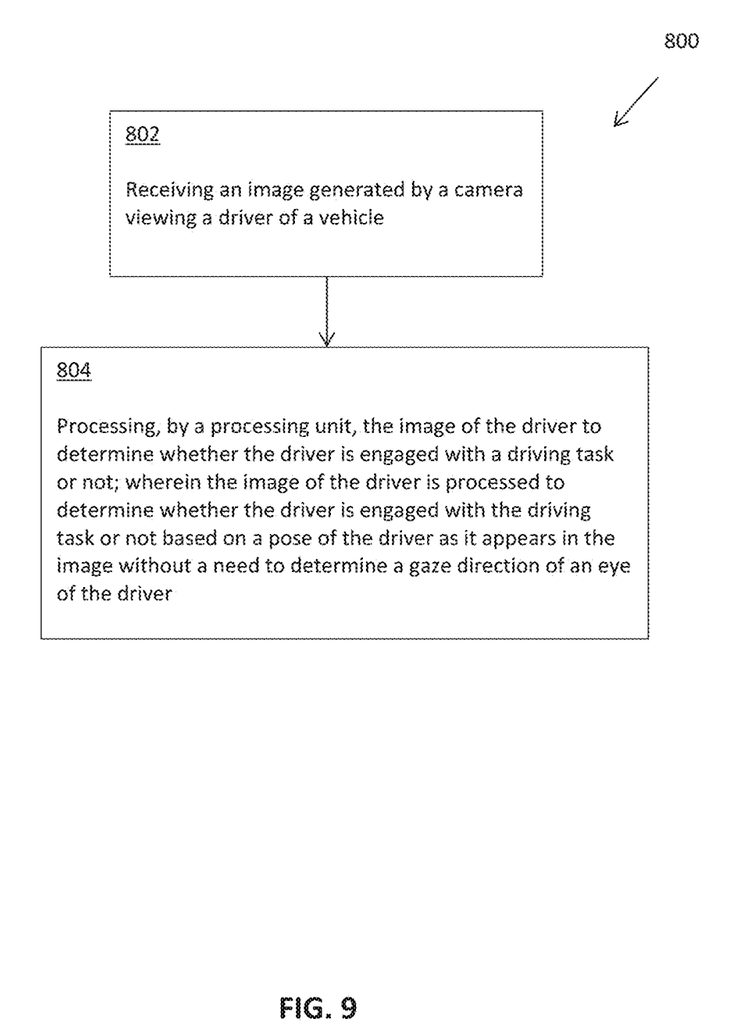
FIG. 9 illustrates a method performed by the apparatus of FIG. 2 in accordance with some embodiments.

FIG. 9 illustrates a method 800 performed by the apparatus 200 of FIG. 2 in accordance with some embodiments. The method 800 includes receiving an image generated by a camera viewing a driver of a vehicle (item 802), and processing, by a processing unit, the image of the driver to determine whether the driver is engaged with a driving task or not; wherein the image of the driver is processed to determine whether the driver is engaged with a driving task or not based on a pose of the driver as it appears in the image without a need to determine a gaze direction of an eye of the driver (item 804).

Optionally, the method 800 further includes, attempting, by the processing unit, to determine the gaze direction; and using a neural network model to determine one or more pose classifications for the driver; wherein the driver is determined to be engaged with a driving task or not based on the one or more pose classifications for the driver if the gaze direction cannot be determined.

Optionally, the method 800 further includes storing a model in a non-transitory medium, wherein the image of the driver is processed based on the model to determine whether the driver is engaged with a driving task or not.

Optionally, in the method 800, the model comprises a neural network model.

Optionally, the method 800 further includes, obtaining the neural network model by a communication unit.

Optionally, in the method 800, the neural network model is trained based on images of other drivers.

Optionally, the method 800 further includes determining metric values for multiple respective pose classifications, wherein the driver is determined to be engaged with a driving task or not based on one or more of the metric values.

Optionally, in the method 800, the pose classifications comprise two or more of: looking-down pose, looking-up pose, looking-left pose, looking-right pose, cellphone-using pose, smoking pose, holding-object pose, hand(s)-not-on-the wheel pose, not-wearing-seatbelt pose, eye(s)-closed pose, looking-straight pose, one-hand-on-wheel pose, and two-hands-on-wheel pose.

Optionally, the method 800 further includes comparing the metric values with respective thresholds for the respective pose classifications.

Optionally, the method 800 further includes determining the driver as belonging to one of the pose classifications if the corresponding one of the metric values meets or surpasses the corresponding one of the thresholds.

Optionally, the method 800 further includes processing the image to determine whether a face of the driver can be detected or not, and wherein the driver is determined to be engaged with a driving task or not if the face of the driver is detected from the image.

Optionally, the method 800 further includes processing the image to determine whether an eye of the driver is closed or not.

Optionally, the method 800 further includes determining the gaze direction, and to determine whether the driver is engaged with a driving task or not based on the gaze direction.

Optionally, the method 800 further includes determining a collision risk based on whether the driver is engaged with a driving task or not.

Optionally, in the method 800, the camera and the processing unit are integrated as parts of an aftermarket device for the vehicle.

Optionally, in the method 800, the aftermarket device includes an additional camera configured to view an environment outside the vehicle.

Figure 10:
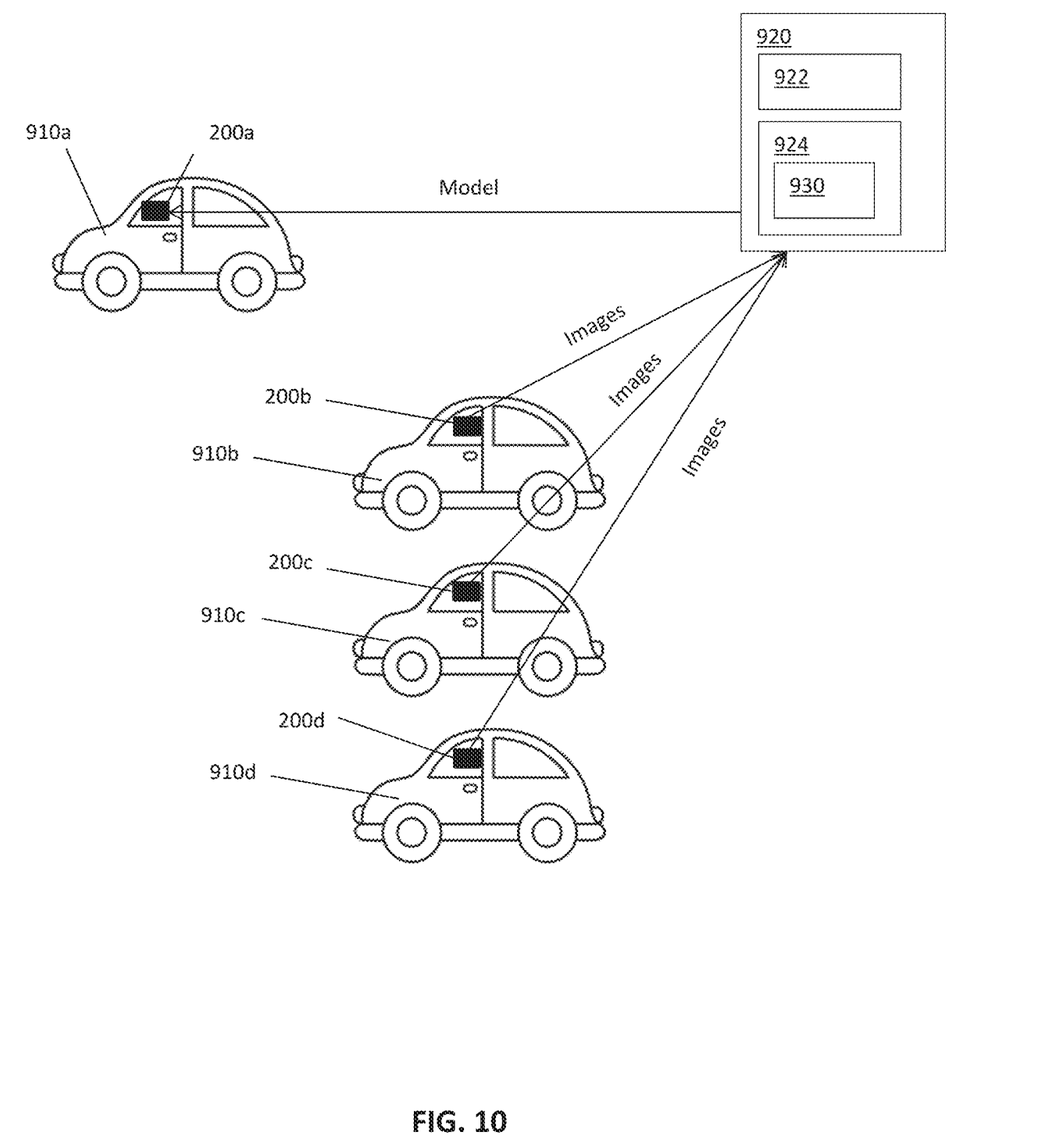
FIG. 10 illustrates a technique of determining a model for use by the apparatus of FIG. 2 in accordance with some embodiments.

FIG. 10 illustrates a technique of determining a model for use by the apparatus 200 in accordance with some embodiments. As shown in the figure, there may be multiple vehicles 910*a*-910*d* with respective apparatuses 200*a*-200*d*. Each of the apparatuses 200*a*-200*d* may have the configuration and features described with reference to the apparatus 200 of FIG. 2. During use, cameras of the apparatuses 200*b*-200*d* in the vehicles 910*b*-910*d* capture images of the environments outside the respective vehicles 910*b*-910*d*. The images are transmitted, directly or indirectly, to a server 920 via a network (e.g., a cloud, the Internet, etc.). The server 920 include a processing unit 922 configured to process the images from the apparatuses 200*b*-300*d* in the vehicles 910*b*-910*d* to determine a model 930. The model 930 may then be stored in a non-transitory medium 924 in the server 920. The server 920 may transmit the model 930, directly or indirectly, to the apparatus 200*a* in the vehicle 910*a* via a network (e.g., a cloud, the Internet, etc.). The apparatus 200*a* can then use the model 930 to process images received by the camera of the apparatus 200*a* to determine a region of interest for the camera.

In the example shown in FIG. 10, there are three apparatuses 200*b*-200*d* in three respective vehicles 910*b*-910*d* for providing images. In other examples, there may be more than three apparatuses 200 in more than three respective vehicles 910 for providing images to the server 920, or there may be fewer than three apparatuses 200 in fewer than three vehicles 910 for providing images to the server 920.

In some embodiments, the model 930 provided by the server 920 may be a neural network model. In such cases, the server 920 may be a neural network, or a part of a neural network, and the images from the apparatuses 200*b*-200*d* may be utilized by the server 920 to configure the model 930. In particular, the processing unit 922 of the server 920 may configure the model 930 by training the model 930 via machine learning. In some cases, the images from the different apparatuses 200b-200d form a rich data set from different cameras mounting at different positions with respect to the corresponding vehicles, which will be useful in training the model 930. As used in this specification, the term "neural network" refers to any computing device, system, or module made up of a number of interconnected processing elements, which process information by their dynamic state response to input. In some embodiments, the neural network may have deep learning capability and/or artificial intelligence. In some embodiments, the neural network may be simply any computing element that can be trained using one or more data sets. By means of non-limiting examples, the neural network may be a perceptron, a feedforward neural network, a radial basis neural network, a deep-feed forward neural network, a recurrent neural network, a long/short term memory neural network, a gated recurrent unit, an auto encoder neural network, a variational auto encoder neural network, a denoising auto encoder neural network, a sparse auto encoder neural network, a Markov chain neural network, a Hopfield neural network, a Boltzmann machine, a restricted Boltzmann machine, a deep belief network, a convolutional network, a deconvolutional network, a deep convolutional inverse graphics network, a generative adversarial network, a liquid state machine, an extreme learning machine, an echo state network, a deep residual network, a Kohonen network, a support vector machine, a neural turing machine, a modular neural network, a sequence-to-sequence model, etc., or any combination of the foregoing.

In some embodiments, the processing unit 922 of the server 920 uses the images to configure (e.g., to train) the model 930 to identify certain poses of drivers. By means of non-limiting examples, the model 930 may be configured to identify whether a driver is looking-down pose, looking-up pose, looking-left pose, looking-right pose, cellphone-using pose, smoking pose, holding-object pose, hand(s)-not-on-the wheel pose, not-wearing-seatbelt pose, eye(s)-closed pose, looking-straight pose, one-hand-on-wheel pose, two-hands-on-wheel pose, etc. Also, in some embodiments, the processing unit 922 of the server 920 may use the images to configure the model to determine whether a driver is engaged with a driving task or not. In some embodiments, the determination of whether a driver is engaged with a driving task or not may be accomplished by a processing unit processing pose classifications of the driver. In one implementation, pose classifications may be output provided by a neural network model. In such cases, the neural network model may be passed to a processing unit, which determines whether the driver is engaged with a driving task or not based on the pose classifications from the neural network model. In other embodiments, the processing unit receiving the pose classifications may be another (e.g., second) neural network model. In such cases, the first neural network model is configured to output pose classifications, and the second neural network model is configured to determine whether a driver is engaged with a driving task or not based on the pose classifications outputted by the first neural network model. In such cases, the model 930 may be considered as having both a first neural network model and a second neural network model. In further embodiments, the model 930 may be a single neural network model that is configured to receive images as input, and to provide an output indicating whether a driver is engaged with a driving task or not.

In other embodiments, the model 930 may not be a neural network model, and may be any of other types of model. In such cases, the configuring of the model 930 by the processing unit 922 may not involve any machine learning, and/or images from the apparatuses 200b-200d may not be needed. Instead, the configuring of the model 930 by the processing unit 922 may be achieved by the processing unit 922 determining (e.g., obtaining, calculating, etc.) processing parameters (such as feature extraction parameters) for the model 930. In some embodiments, the model may include program instructions, commands, scripts, parameters (e.g., feature extraction parameters), etc. In one implementation, the model may be in a form of an application that can be received wirelessly by the apparatus 200.

After the model 930 has been configured by the server 920, the model 930 is then available for use by apparatuses 200 in different vehicles 910 to identify objects in camera images. As shown in the figure, the model 930 may be transmitted from the server 920 to the apparatus 200a in the vehicle 910a. The model 930 may also be transmitted from the server 920 to the apparatuses 200b-200d in the respective vehicles 910b-910d. After the apparatus 200a has received the model 930, the processing unit in the apparatus 200a may then process images generated by the camera of the apparatus 200a to identify poses of drivers, and/or to determine whether drivers are engaged with a driving task or not, as described herein.

In some embodiments, the transmission of the model 930 from the server 920 to the apparatus 200 (e.g., the apparatus 200a) may be performed by the server 920 "pushing" the model 930, so that the apparatus 200 is not required to request for the model 930. In other embodiments, the transmission of the model 930 from the server 920 may be performed by the server 920 in response to a signal generated and sent by the apparatus 200. For example, the apparatus 200 may generate and transmit a signal after the apparatus 200 is turned on, or after the vehicle with the apparatus 200 has been started. The signal may be received by the server 920, which then transmits the model 930 for reception by the apparatus 200. As another example, the apparatus 200 may include a user interface, such as a button, which allows a user of the apparatus 200 to send a request for the model 930. In such cases, when the button is pressed, the apparatus 200 then transmits a request for the model 930 to the server 920. In response to the request, the server 920 then transmits the model to the apparatus 200.

It should be noted that the server 920 of FIG. 10 is not limiting to being one server device, and may be more than one server devices. Also, the processing unit 922 of the server 920 may include one or more processors, one or more processing modules, etc.

In other embodiments, the images obtained by the server 920 may not be generated by the apparatuses 200b-200d. Instead, the images used by the server 920 to determine (e.g., to train, to configure, etc.) the model 930 may be recorded using other device(s), such as mobile phone(s), camera(s) in other vehicles, etc. Also, in other embodiments, the images used by the server 920 to determine (e.g., to train, to configure, etc.) the model 930 may be downloaded to the server 920 from a database, such as from a database associated with the server 920, or a database owned by a third party.

Specialized Processing System

Figure 11:
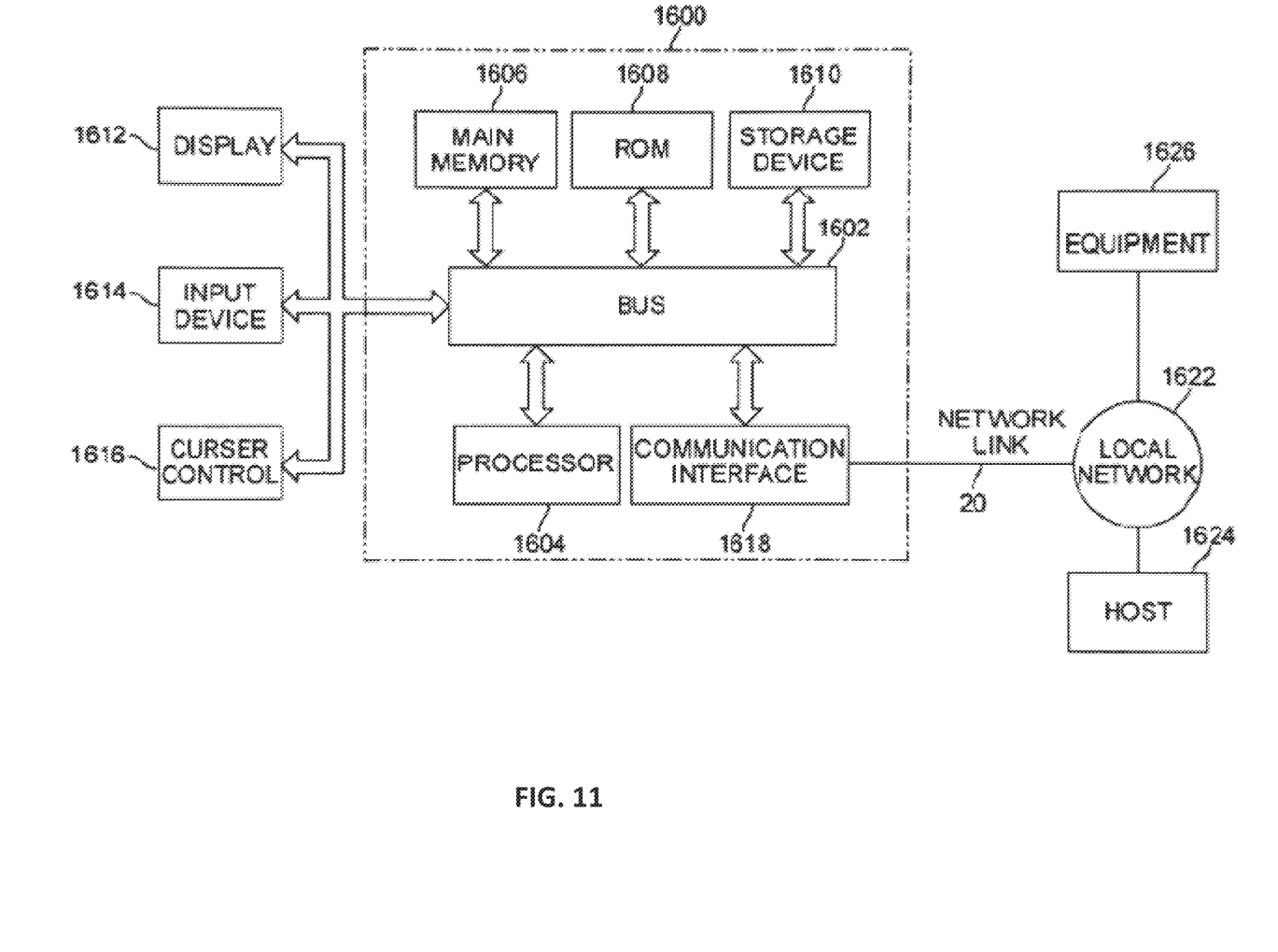
FIG. 11 illustrates a specialized processing system for implementing one or more electronic devices described herein.

FIG. 11 illustrates a specialized processing system for implementing one or more electronic devices described herein. For examples, the processing system 1600 may implement the apparatus 200, or at least a part of the apparatus 200, such as the processing unit 210 of the apparatus 200.

Processing system 1600 includes a bus 1602 or other communication mechanism for communicating information, and a processor 1604 coupled with the bus 1602 for processing information. The processor system 1600 also includes a main memory 1606, such as a random access memory (RAM) or other dynamic storage device, coupled to the bus 1602 for storing information and instructions to be executed by the processor 1604. The main memory 1606 also may be used for storing temporary variables or other intermediate information during execution of instructions to be executed by the processor 1604. The processor system 1600 further includes a read only memory (ROM) 1608 or other static storage device coupled to the bus 1602 for storing static information and instructions for the processor 1604. A data storage device 1610, such as a magnetic disk or optical disk, is provided and coupled to the bus 1602 for storing information and instructions.

The processor system 1600 may be coupled via the bus 1602 to a display 167, such as a screen or a flat panel, for displaying information to a user. An input device 1614, including alphanumeric and other keys, or a touchscreen, is coupled to the bus 1602 for communicating information and command selections to processor 1604. Another type of user input device is cursor control 1616, such as a touchpad, a touchscreen, a trackball, or cursor direction keys for communicating direction information and command selections to processor 1604 and for controlling cursor movement on display 167. This input device typically has two degrees of freedom in two axes, a first axis (e.g., x) and a second axis (e.g., y), that allows the device to specify positions in a plane.

In some embodiments, the processor system 1600 can be used to perform various functions described herein. According to some embodiments, such use is provided by processor system 1600 in response to processor 1604 executing one or more sequences of one or more instructions contained in the main memory 1606. Those skilled in the art will know how to prepare such instructions based on the functions and methods described herein. Such instructions may be read into the main memory 1606 from another processor-readable medium, such as storage device 1610. Execution of the sequences of instructions contained in the main memory 1606 causes the processor 1604 to perform the process steps described herein. One or more processors in a multi-processing arrangement may also be employed to execute the sequences of instructions contained in the main memory 1606. In alternative embodiments, hard-wired circuitry may be used in place of or in combination with software instructions to implement the various embodiments described herein. Thus, embodiments are not limited to any specific combination of hardware circuitry and software.

The term "processor-readable medium" as used herein refers to any medium that participates in providing instructions to the processor 1604 for execution. Such a medium may take many forms, including but not limited to, non-volatile media, volatile media, and transmission media. Non-volatile media includes, for example, optical or magnetic disks, such as the storage device 1610. A non-volatile medium may be considered an example of non-transitory medium. Volatile media includes dynamic memory, such as the main memory 1606. A volatile medium may be considered an example of non-transitory medium. Transmission media includes cables, wire and fiber optics, including the wires that comprise the bus 1602. Transmission media can also take the form of acoustic or light waves, such as those generated during radio wave and infrared data communications.

Common forms of processor-readable media include, for example, hard disk, a magnetic medium, a CD-ROM, any other optical medium, a RAM, a PROM, and EPROM, a FLASH-EPROM, any other memory chip or cartridge, a carrier wave as described hereinafter, or any other medium from which a processor can read.

Various forms of processor-readable media may be involved in carrying one or more sequences of one or more instructions to the processor 1604 for execution. For example, the instructions may initially be carried on a storage of a remote computer or remote device. The remote computer or device can send the instructions over a network, such as the Internet. A receiving unit local to the processing system 1600 can receive the data from the network, and provide the data on the bus 1602. The bus 1602 carries the data to the main memory 1606, from which the processor 1604 retrieves and executes the instructions. The instructions received by the main memory 1606 may optionally be stored on the storage device 1610 either before or after execution by the processor 1604.

The processing system 1600 also includes a communication interface 1618 coupled to the bus 1602. The communication interface 1618 provides a two-way data communication coupling to a network link 1620 that is connected to a local network 1622. For example, the communication interface 1618 may be an integrated services digital network (ISDN) card to provide a data communication. As another example, the communication interface 1618 may be a local area network (LAN) card to provide a data communication connection to a compatible LAN. Wireless links may also be implemented. In any such implementation, the communication interface 1618 sends and receives electrical, electromagnetic or optical signals that carry data streams representing various types of information.

The network link 1620 typically provides data communication through one or more networks to other devices. For example, the network link 1620 may provide a connection through local network 1622 to a host computer 1624 or to equipment 1626. The data streams transported over the network link 1620 can comprise electrical, electromagnetic or optical signals. The signals through the various networks and the signals on the network link 1620 and through the communication interface 1618, which carry data to and from the processing system 1600, are exemplary forms of carrier waves transporting the information. The processing system 1600 can send messages and receive data, including program code, through the network(s), the network link 1620, and the communication interface 1618.

As used in this specification, the term "image" is not limited to an image that is displayed, and may refer to an image that is displayed or not displayed (e.g., an image in data or digital form that is stored). Similarly, as used in this specification, the term "graphical element" or any of other similar terms, such as "graphical identifier", may refer to an item that is displayed or not displayed. The item may be a computational element, an equation representing the graphical element/identifier, one or more geometric parameters associated with the graphical element/identifier.

In addition, as used in this specification, the term "model" may refer to one or more algorithms, one or more equations, one or more processing applications, one or more variables, one or more criteria, one or more parameters, or any combination of two or more of the foregoing.

Furthermore, as used in this specification, the phrase "determine whether the driver is engaged with a driving task or not", or any of other similar phrases, do not necessarily require both (1) "driver is engaged with a driving task" and (2) "driver is not engaged with a driving task" to be possible determination outcomes. Rather, such phrase and similar phases are intended to cover (1) "driver is engaged with a driving task" as a possible determination outcome, or (2) "driver is not engaged with a driving task" as a possible determination outcome, or (3) both "driver is engaged with a driving task" and "driver is not engaged with a driving task" to be possible determination outcomes. Also, the above phrase and other similar phrases do not exclude other determination outcomes, such as an outcome indicating that a state of the driver is unknown. For example, the above phrase or other similar phrases cover an embodiment in which a processing unit is configured to determine that (1) the driver is engaged with a driving task, or (2) it is unknown whether the driver is engaged with a driving task, as two possible processing outcomes (because the first part of the phrase mentions the determination outcome (1)). As another example, the above phrase or other similar phrases cover an embodiment in which a processing unit is configured to determine that (1) the driver is not engaged with a driving task, or (2) it is unknown whether the driver is not engaged with a driving task, as two possible processing outcomes (because the later part of the phrase mentions the determination outcome (2)).

Also, as used in this specification, the term "signal" may refer to one or more signals. By means of non-limiting examples, a signal may include one or more data, one or more information, one or more signal values, one or more discrete values, etc.

Although particular features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications and equivalents.

What is claimed:

1. An apparatus comprising:
a camera configured to view a driver of a vehicle;
an additional camera configured to view an environment outside the vehicle; and
a processing unit configured to receive an image of the driver from the camera;
wherein the processing unit is configured to process the image of the driver;
wherein the processing unit is configured to determine whether the driver is engaged with a driving task or not based on a pose of the driver as it appears in the image, and also based on one or more images from the additional camera that is configured to view the environment outside the vehicle, the one or more images from the additional camera comprising an image of the environment outside the vehicle;
wherein the processing unit is configured to determine the pose of the driver as it appears in the image based on a pose classification threshold, and wherein the pose classification threshold is for comparison with a pose classification score provided by a neural network model, the pose classification score comprising a head orientation score; and
wherein the processing unit is configured to adjust the pose classification threshold based on the image of the environment outside the vehicle.

2. The apparatus of claim 1, wherein the processing unit is configured to attempt to determine a gaze direction of an eye of the driver; and
wherein the processing unit is configured to determine whether the driver is engaged with the driving task or not based on the one or more pose classifications for the driver after the processing unit is unable to determine the gaze direction.

3. The apparatus of claim 1, further comprising a non-transitory medium storing the neural network model.

4. The apparatus of claim 1, further comprising a communication unit configured to obtain the neural network model.

5. The apparatus of claim 1, wherein the neural network model is trained based on images of other drivers.

6. The apparatus of claim 1, wherein the processing unit is configured to obtain metric values for multiple respective pose classifications, one of the metric values being the head orientation score, and wherein the processing unit is configured to determine whether the driver is engaged with the driving task or not based on one or more of the metric values.

7. The apparatus of claim 6, wherein the pose classifications comprise two or more of: looking-down pose, looking-up pose, looking-left pose, looking-right pose, cellphone-using pose, smoking pose, holding-object pose, hand(s)-not-on-the wheel pose, not-wearing-seatbelt pose, eye(s)-closed pose, looking-straight pose, one-hand-on-wheel pose, and two-hands-on-wheel pose.

8. The apparatus of claim 6, wherein the processing unit is configured to compare the metric values with respective thresholds for the respective pose classifications, and wherein the pose classification threshold is one of the thresholds.

9. The apparatus of claim 8, wherein the processing unit is configured to determine the driver as belonging to one of the pose classifications after the corresponding one of the metric values meets or surpasses the corresponding one of the thresholds.

10. The apparatus of claim 8, wherein the processing unit is configured to determine the driver as engaged with the driving task or not after one or more of the metric values meet or surpass the corresponding one or more of the thresholds.

11. The apparatus of claim 1, wherein the processing unit is also configured to process the image to determine whether a face of the driver is detected or not, and wherein the processing unit is configured to process the image of the driver to determine whether the driver is engaged with the driving task or not after the face of the driver is detected from the image.

12. The apparatus of claim 1, wherein the processing unit is also configured to process the image to determine whether an eye of the driver is closed or not.

13. The apparatus of claim 1, wherein the processing unit is also configured to determine a gaze direction of an eye of the driver, and to determine whether the driver is engaged with the driving task or not based on the gaze direction.

14. The apparatus of claim 1, wherein the processing unit is also configured to determine a collision risk based on whether the driver is engaged with the driving task or not.

15. The apparatus of claim 1, wherein the camera and the processing unit are integrated as parts of an aftermarket device for the vehicle.

16. The apparatus of claim 15, wherein the additional camera is a part of the aftermarket device.

17. An apparatus comprising:
a camera configured to view a driver of a vehicle; and
a processing unit configured to receive an image of the driver from the camera;
wherein the processing unit is configured to attempt to determine a gaze direction of an eye of the driver;
wherein the processing unit is configured to determine whether the driver is engaged with a driving task or not based on one or more pose classifications for the driver and also based on an image from an additional camera viewing an environment outside the vehicle, when the processing unit is unable to determine the gaze direction, the image from the additional camera comprising an image of the environment outside the vehicle; and
wherein the processing unit is configured to adjust a threshold for determining at least one of the pose classifications, wherein the threshold is for comparison with a pose classification score provided by a neural network model, the pose classification score comprising a head orientation score, and wherein the processing unit is configured to adjust the threshold based on the image of the environment outside the vehicle.

18. The apparatus of claim 17, wherein the processing unit is configured to process the image of the driver to determine whether the image of the driver meets one or more pose classifications or not; and
wherein the processing unit is configured to determine whether the driver is engaged with the driving task or not based on the image of the driver meeting the one or more pose classifications or not.

19. The apparatus of claim 17, wherein the processing unit is configured to process the image of the driver based on the neural network model to determine whether the driver is engaged with the driving task or not.

20. A method performed by an apparatus, the method comprising:
obtaining an image of a driver of a vehicle generated by a camera viewing the driver of the vehicle;
obtaining another image generated by an additional camera that is configured to view an environment outside the vehicle;
processing, by a processing unit, the image of the driver;
determining a pose of the driver based on a threshold, wherein the threshold is for comparison with a pose classification score provided by a neural network model, the pose classification score comprising a head orientation score; and
determining whether the driver is engaged with a driving task or not based on the pose of the driver, and also based on the another image generated by the additional camera that is configured to view the environment outside the vehicle, the another image generated by the additional camera comprises an image of the environment outside the vehicle;
wherein the method further comprises adjusting the threshold, wherein the threshold is adjusted based on the image of the environment outside the vehicle.

21. The apparatus of claim 1, wherein the pose classification score has a value that is anywhere from 0 to 1.

22. The apparatus of claim 1, wherein the pose classification score indicates a pose classification probability.

23. The apparatus of claim 17, wherein the pose classification score has a value that is anywhere from 0 to 1.

24. The apparatus of claim 17, wherein the pose classification score indicates a pose classification probability.

25. The method of claim 20, wherein the pose classification score has a value that is anywhere from 0 to 1.

26. The method of claim 20, wherein the pose classification score indicates a pose classification probability.

* * * * *